(12) United States Patent
Thramann

(10) Patent No.: US 9,589,433 B1
(45) Date of Patent: Mar. 7, 2017

(54) SELF-CHECKOUT ANTI-THEFT DEVICE

(71) Applicant: Jeff Thramann, Longmont, CO (US)

(72) Inventor: Jeff Thramann, Longmont, CO (US)

(*) Notice: Subject to any disclaimer, the term of this patent is extended or adjusted under 35 U.S.C. 154(b) by 281 days.

(21) Appl. No.: 14/447,311

(22) Filed: Jul. 30, 2014

Related U.S. Application Data

(60) Provisional application No. 61/860,404, filed on Jul. 31, 2013.

(51) Int. Cl.
| | |
|---|---|
| *G08B 13/14* | (2006.01) |
| *G08B 13/196* | (2006.01) |
| *G07G 3/00* | (2006.01) |
| *G01S 3/786* | (2006.01) |
| *G06Q 20/18* | (2012.01) |
| *G06Q 20/20* | (2012.01) |
| *G07G 1/00* | (2006.01) |
| *A47F 9/04* | (2006.01) |

(52) U.S. Cl.
CPC ........ *G08B 13/19613* (2013.01); *A47F 9/046* (2013.01); *G01S 3/7864* (2013.01); *G06Q 20/18* (2013.01); *G06Q 20/20* (2013.01); *G06Q 20/208* (2013.01); *G07G 1/0054* (2013.01); *G07G 3/003* (2013.01); *G07G 3/006* (2013.01); *G08B 13/19606* (2013.01); *G08B 13/19639* (2013.01)

(58) Field of Classification Search
CPC ...... G07G 1/0054; G07G 3/006; G06Q 20/20; G06Q 20/208; A47F 9/046
USPC ................. 340/568.1; 235/383, 385; 186/61; 705/16
See application file for complete search history.

(56) References Cited

U.S. PATENT DOCUMENTS

| | | | | |
|---|---|---|---|---|
| 5,967,264 | A * | 10/1999 | Lutz | A47F 9/048 186/61 |
| 6,990,463 | B2 * | 1/2006 | Walter | A47F 9/046 235/383 |
| 7,341,184 | B2 * | 3/2008 | Morris | G07G 1/0054 235/383 |
| 7,909,248 | B1 * | 3/2011 | Goncalves | G07G 1/0063 235/383 |
| 8,196,822 | B2 * | 6/2012 | Goncalves | G07G 1/0063 235/383 |
| 8,290,814 | B2 * | 10/2012 | Walter | G07G 1/0054 186/61 |
| 2004/0238629 | A1 * | 12/2004 | Buchholz | G07G 1/0054 235/383 |

* cited by examiner

*Primary Examiner* — John A Tweel, Jr.
(74) *Attorney, Agent, or Firm* — Perkins Coie LLP

(57) ABSTRACT

The technology of the application provides an anti-theft self-checkout system to facilitate theft detection. The technology includes a post-purchase product location located in a field of view of an image detector. The post-purchase product location includes a scale to generate an actual weight of purchased products. The technology further includes a scanner that identifies products for purchase where the scanner is within the field of view. The image detector detects and tracks the movement of at least one of limbs or products through the field of view to the post-purchase product location. A processor compares the actual movement to a database of movements and generates a movement violation signal based on the comparison. The processor calculates a running weight of scanned products purchased and compares the running weight to the actual weight and generates a weight violation signal if the running weight and actual weight are outside of a tolerance.

18 Claims, 5 Drawing Sheets

SELF-CHECKOUT ANTI-THEFT DEVICE

CROSS-REFERENCE TO RELATED PATENT APPLICATIONS

The present patent applications claims priority to U.S. Provisional Patent Application Ser. No. 61/860,404, filed Jul. 31, 2013, a copy of which is incorporated herein by reference as if set out in full.

BACKGROUND

Retail shopping is ubiquitous in industrialized countries, and especially in urban areas. A large component of costs associated with retail shopping includes the cost of labor and the cost of "shrink". Shrink is when a retail establishment purchases an item of inventory, but cannot recoup the purchase price. Shrink can include, among other things, theft and vandalism.

Retail shopping provides numerous opportunities for dishonest shoppers to engage in theft. Shoppers can surreptitiously pocket items as they shop. In certain retail stores, individuals may wear items out of the stores.

In an effort to reduce labor costs, many retail stores, but especially conventional grocery stores, cashier manned checkout stations are being replaced with self-checkout stations or kiosks. A self-checkout station in most stores comprises a processor, a graphical user interface (GUI) display, a scanner, and a checkout table having a general weight or item sensor. A customer would scan a Universal Product Code (UPC) associated with an item being purchased. The scanner transmits the UPC in a digital format to the processor that looks up the item in a database associated with the store inventory. The processor causes the GUI to display the item and cost to the customer, for comparison, and provides the weight of the item being purchased to a summing engine. The summing engine adds the weight of the item to a running weight total. A comparator or a comparison engine compares the running weight total to the total or actual weight of the items on the checkout table. If the running weight and the total weight are different by a sufficient amount, the self-checkout station signals for an employee assistance. While considered a self-checkout station, a retail store typically provides an employee to monitor and assist with a number of self-checkout stations.

While generally functional, self-checkout stations provide numerous opportunities for theft. For example, the system may inadvertently allow for items to be placed in the bag without being scanned. Also, a customer may scan one item and deposit another in the bag of a similar weight, but higher price.

To aid against these nefarious activities, some retail outlets use camera imaging to facilitate monitoring of self-checkout stations. For example, U.S. Pat. No. 5,965,861 discloses an imaging system to inhibit theft at a self-checkout station. In particular, the UPC code is further identified with an image stored in the database. The imaging system captures one or more images of the product scanned and compares the stored image with the actual image. However, cameras can be obscured from a field of view and the actual product orientation may not correspond to the stored image of the product resulting in limited usefulness of the '861 patent. Another exemplary system is disclosed by U.S. Pat. No. 6,236,736. The '736 patent discloses using a video camera that detects objects moving in a field of view. The video camera sends the images to a processor that identifies which of the objects, if any, comprises a hand and uses a complex frame grabbing application to track movement pixel by pixel as the hand moves through the field of view. The '736 patent generally notes whether hands are moving in the correct direction with or without products and other hand movements that may indicate nefarious activities. One exemplary embodiment includes imaging a hand and product passing over a scan in one video frame and another video frame imaging the hand and the product at the bagging area placing the product in the bag. The next frames would show the hand empty moving in the opposite direction. Once again, however, the imaging system may be obscured and items may be moved to the bagging area outside the field of view.

As can be appreciated, however, the above technologies are deficient in one or more aspects. Thus, it is against this background that an improved self-checkout station anti-theft device is provided. Moreover, the anti-theft device should be employable in multiple locations in a store as an anti-theft device at a checkout (whether a cashier or self-checkout) is the last line of defense in identifying nefarious behavior.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The technology of the present application provides a system and method to facilitate the detection of theft in self-checkout systems. In one aspect, the system provides a processor, a memory, a scanner, an image detector, and a post-purchase location. The scanner is operatively connected to the processor and configured to detect and transmit to the processor a scanned product from a plurality of products being scanned for purchase. The memory contains instructions for causing the processor, image detector, and the like to operate as well as at least one database of predefined movements through a field of view and product information corresponding to the plurality of products wherein the product information includes at least a cost and a weight of each of the plurality of products, the memory operatively coupled to the processor. The image detector to at least detect and track actual movement through a field of view and transmit the tracked actual movement to the processor. A post-purchase location contained in the field of view of the image detector is located a distance from a pre-purchase location. The post-purchase location includes at least one scale to detect and transmit to the processor a total weight of products placed in the portable post-purchase location. The processor is sum the weight of each of the scanned products detected during a transaction and to obtain the total weight of products placed in the portable post-purchase location from the scale. The processor compares the sum and the total weight to determine whether the sum and the total weight are within a predefined tolerance, wherein the processor does not generate a weight violation signal when the sum and the total weight are within a predefined tolerance and does generate the weight violation signal when the sum and the total weight are outside the predefined tolerance. The processor also compares the tracked actual movement through the field of view to the predefined movements through the field of view stored in memory. The processor generates a movement violation signal based on the comparison of the tracked actual movement and the predefined movements through the field of view.

The technology of the present application also provides a method for facilitating the detection of theft in self-checkout systems. The method includes, among other things, obtaining an image of a field of view wherein the field of view contains a post-purchase product location into which at least one purchased product is placed. The method includes receiving at a processor data from a scanner corresponding to a product to be purchased, wherein the data identifies the scanned product from a plurality of products. The method also includes tracking movement through the field of view as the scanned product is moved to the post-purchase product location using an image detector. A processor determines whether the tracked movement is an allowed movement by comparing the tracked movement to allowed movement stored in memory and generates a movement violation signal when the tracked movement is determined to be an unallowed movement. The processor also receives a signal from the post-purchase product location of a total actual weight of purchased products contained in the post-purchase product location and calculates the total expected weight by summing the weights of the scanned products using weight data stored in the memory. The processor generates a weight violation signal when the total expected weight and the total actual weight are outside of a predefined tolerance.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to self-checkout stations or kiosks. However, the technology described herein may be used for other anti-theft devices, such as, retail store aisles, open markets, or other areas where sleight of hand or obscuring vision may lead itself to abuses including theft. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
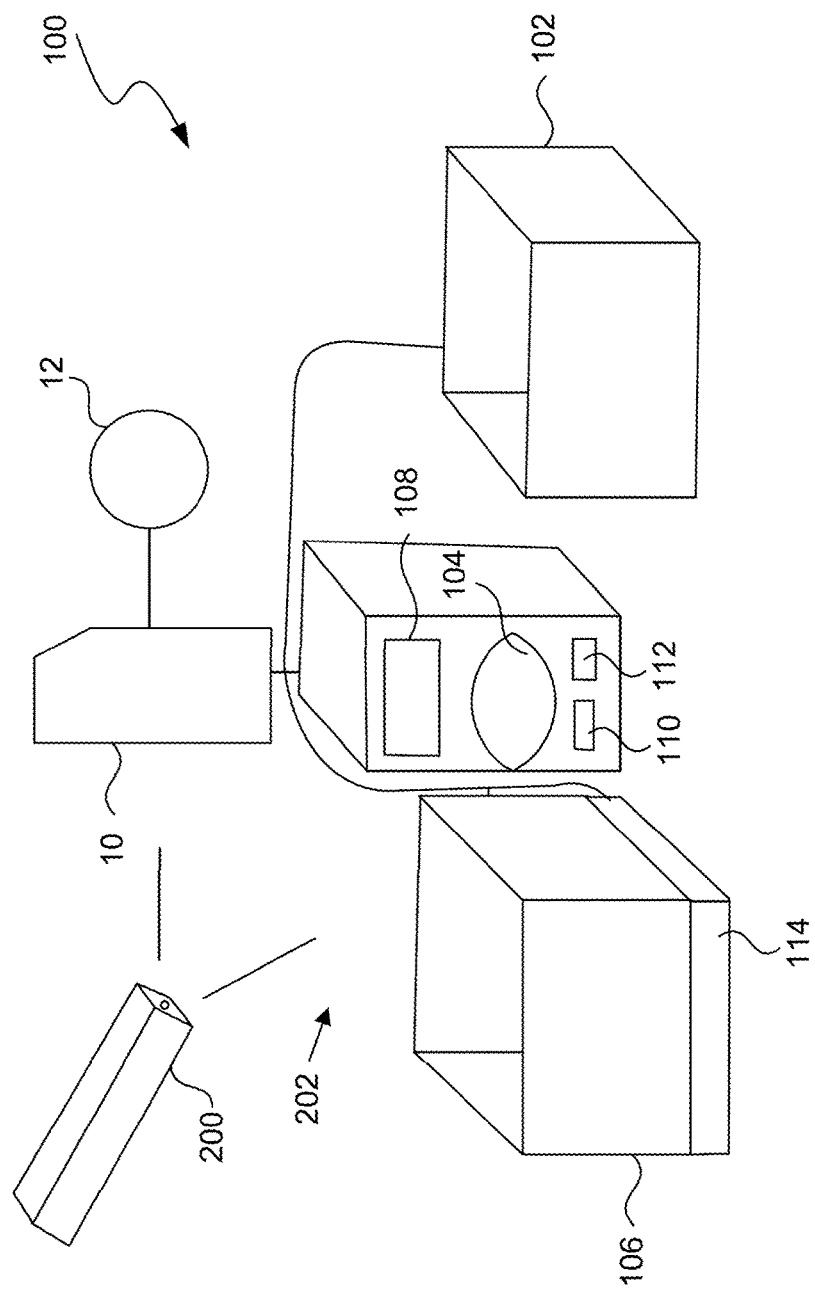
FIG. 1 is a functional block diagram of a self-checkout station incorporating technology consistent with the disclosure of the present application.

With reference now to FIG. 1, a self-checkout station 100 having an anti-theft system consistent with the present application is disclosed. The self-checkout station 100 includes a processor 10 and memory 12 as will be explained further below. The self-checkout station 100 includes various devices that provide inputs to the processor 10. The devices operatively coupled to the processor 10 include, for example, a pre-purchase product placement location 102, a scanner 104, a post-purchase product placement location 106, a graphical user interface 108, a card swiper 110, a monetary receptacle 112, and a scale 114. The pre-purchase product placement location may be a shelf, table, or the like capable of holding items or containers for items that conventional shoppers may use. The scanner 104 may be a conventional UPC scanner as is generally known in the art. The scanner 104 is capable of optically reading the UPC code on a product being purchased by a customer. The UPC code is converted to a digital signal that the processor 10 receives. The processor 10 uses the UPC code to look up information regarding the product from memory 12. The information may include, among other things, the price of the item, the weight of the item, a digital image of the item, a color of the item, a name of the item, and the like. The processor 10 may cause the graphical user interface 108 to display the item linked to the UPC code scanned by scanner 104 to allow the customer to confirm the purchase. The display also may include a running total of customer cost as well as a break out of individual tax information and a running tax total as applicable.

After confirming the product scanned by scanner 104 and registered by the processor 10, the customer may place the item in the post-purchase product location 106. A scale 114 or weight detector associated with the post-purchase location may register the actual total weight of items purchased. The post-purchase location 106 may be a bag, table, shopping cart, or carrying container as are conventionally available at retail and grocery outlets. In such cases, the scale may be connected to the base of a shopping cart (or multiple locations to facilitate placement of delicate items separate from bulk items) or the scale may be a strain gauge or the like associated handle of the carrying container. The processor 10 also computes the running weight of products purchased (or summed weight of products purchased) and compares the running weight to the actual total weight to determine if additional products are added to the post-purchase location 106 without the product having been scanned. The processor also may alert if the weight indicates a purchased item is not placed in the post-purchase product location 106, which may inhibit a customer from leaving the premises without a paid for product. Similarly, if the weight indicates an item has been placed in the post-purchase product location 106 without being first purchased by the customer. Items may be un-purchased by a similar reverse transaction where the weight is deducted from the running total after a "reverse" scan is performed. In these instances, the GUI would have an "un-purchase" button or the like such that the next scan deducts the item from the purchased items. Generally, the running weight and the actual weight are determined by the processor to be within a predefined tolerance, which tolerance may be between, for example, 0 and 10%. Violations detected by the processor when the weights are outside a predefined tolerance may be identified as weight violation signals.

The processor 10 at least after the first scanned item may cause the graphical user interface 108 to display a finish transaction icon to the customers, such as, for example, a "PAY" icon. When the customer selects the icon, the total purchase price including taxes or other additional charges is presented to the customer who is provided with several alternatives to pay the invoice. If the customer selects a cash payment option, the customer would insert money into the monetary receptacle (or receptacles) 112. The monetary receptacle 112 would transmit signals of bills or coins submitted to the processor 10 that would tally the submitted cash payment until the total cost required was equaled or exceeded, at which time the transaction would end and change, if any, would be provided. Alternatively, the customer may select a card transaction, such as, for example, a gift card, a credit card, a debit card, or the like. The card swiper 110 would read the information on the card and process the payment accordingly. In still other embodiments, the graphical user interface 108 may provide options for direct account transfers, wireless communication with a payment program on a mobile device, or the like, as is conventionally known in the art, or a combination of all of the above.

The self-checkout station 100 further includes at least one imaging detection and tracking (IDT) system 200. IDT system 200 is a 3-dimensional imaging system that is capable of monitoring items in a field of view. For example, a customer's arm may move through the field of view 202 about the self-checkout station 100. The IDT system 200 would image and track the motion of the arm through the field of view 202. Further, as will be explained below, the IDT system 200 may be operatively connected to processor 10 (or another processor). The IDT system 200 may track visible portions of the customer's arm and, based on an anatomy database, be capable of calculating the estimated positions of hands and arms when portions of the same may be obscured by the camera. In one exemplary embodiment, the IDT system 200 incorporates the motion sensing and tracking ability of the KINECT™ system available from Microsoft corporation. In other exemplary embodiment, the IDT system 200 may include a 3-dimensional camera system developed by PrimeSense Ltd. That interprets information to develop a digitized 3-dimensional model. In some cases, the motion sensing mechanism may include a RGB (Red, Green, Blue) camera and a depth sensor. The depth sensor may comprise an infrared laser combined with a monochrome CMOS sensor that captures video data in 3-dimensions. The depth sensor allows tracking multiple items (multiple limbs of a single individual, the same limb from multiple individuals, or multiple limbs from multiple individuals, or a combination thereof). In other exemplary embodiments, the IDT system 200 may use the RGB camera to enable visual recognition of the limbs or products. Other possible products that may be capable of functioning as the IDT system 200 include, for example, Wii® as available from Nintendo Co., Project Natal™ as available from Microsoft Corporation, PlayStation Move™ as available from Sony Computer Entertainment Company, and the like. Other commercially produced components of system that may be adaptable for the technology of the present application include various handheld devices having motion-sensing technology such as, for example, gyroscopes, accelerometers, or the like, such as, for example, the iPad™, iPod™, and iPhone™ as available from Apple Inc.

If visual recognition is enabled, for example, when the processor 10 obtains an image of an object memory 12 based on the UPC code, the processor 10 may compare the images for similarity or differences to alert whether the product scanned matches the image taken, which would recognize mislabeled UPC items (whether mislabeled intentionally or unintentionally). The processor 10 in certain embodiments may include an orientation module 14 to orient the image taken by IDT system 200 to match the orientation of the image linked by the UPC code.

The above self-checkout station 100 described with reference to FIG. 1 is a stationary kiosk. The self-checkout station 100, however, is not necessarily stationary. In particular, the connections between the various components described above may be wireless connections allowing the various components to be portable. In one particular embodiment, the scanner 106 may be a portable scanning device held by a customer. The scanner 106 may be in communication with a wireless device of the customer, such as a smartphone, personal digital assistant, laptop, cellular phone, tablet computer, or the like, that is operably connected to a card swiper 110, such as, for example, a swipe adapter from Square Register or the like, or to a mobile payment application, such as, for example, Google Wallet. In the case of the portable scanner 106, the pre-purchase product location 102 may be a store location, such as a retail shelf, cooler, bin, stand, hanging rack, or the like. The post-purchase product location 106 may be a hand or push cart into which the customer can place products subsequent to scanning. For the portable system, the IDT system 200 may include a plurality of IDT systems established throughout the store to capture multiple individuals and multiple areas. The system may be defined such that each IDT system 200 provides for overlapping fields of view. When overlapping, each system may independently monitor individuals in those fields where only one of the IDT systems 200 needs to detect suspicious behavior. Alternatively, the IDT systems 200 may provide non-overlapping fields of view although this runs a risk that certain areas of a retail space may not be monitored at all. Hand offs from one field of view to another field of view may be accomplished in a number of ways including the controlling IDT system may be the one with the highest resolution or the field where the majority of the customer is visible.

Figure 2:
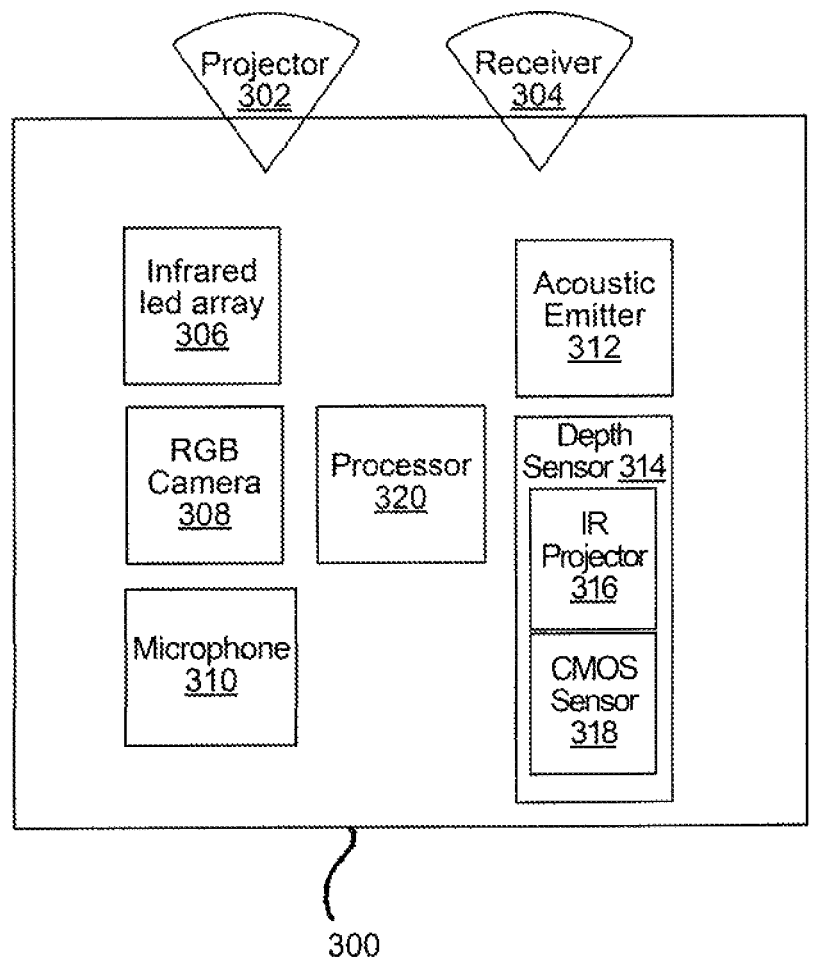
FIG. 2 is a functional block diagram of an imaging device used with the self-checkout station of FIG. 1.

Referring now to FIG. 2, an imaging device 300 for one exemplary IDT system 200 is provided. The IDT system 200 includes a projector 302, a receiver 304, an infrared LED array 306, a RGB camera 308, a multiarray microphone 310, an acoustic emitter 312, a depth sensor 314, which may separately include an infrared projector 316 and monochrome CMOS sensor 318, and a processor 320. While shown as a separate processor for convenience, the processor 320 may be integrated with the processor 10. As used with reference to FIG. 2, each of the above may include software, hardware, or a combination of software and hardware to facilitate the operation of the IDT system 200. Moreover, while shown as a combined unit, one or more of the functional block diagram units shown in FIG. 2 may be located in a separate device or remote from the IDT system 200. Additionally, one or more of the functional block diagram units may comprise multiple units or modules and/or one or more of the functional block diagram units may be combined with others of the functional block diagram units.

The IDT system 200 provides a system capable of tracking objects in a field of view. As can be appreciated, the above IDT system 200 is described in conjunction with use associated with self-checkout station but IDT system 200 may be provided in other locations, especially locations in a store that are more likely than other to be subjected to theft of objects as will be explained further below. In such cases, the IDT system 200 may be provided separately although the overall function of the IDT system 200 would be similar.

During operation, the components of the IDT system 200 are operationally connected with one another, either by wires or wirelessly such as by infrared, Wi-Fi, wireless local area network, Bluetooth, near field communication, or other suitable wireless communication technology. When focused on a subject, the system can provide three dimensional views of the objects being tracked including, in some instances, estimated positions of items being tracked that are obscured from view. For example, if IDT system 200 is tracking a customer's arm and hand in a field of view, the IDT system 200 may have an anatomical database indicative of the average person's range of skeletal movement. Thus, when the arm moves such that, for example, the hand is obscured from view by the body, the IDT system 200 may cause the processor 320 (or processor 10) to estimate the location of the hand based on the known location and orientation of the arm. An optional microphone also may be used to detect sounds of movement that are indicative of ongoing activities. In one particular exemplary embodiment, the IDT system may identify key points on an arm of an individual. Using the key points, the processor 10 (or 320) may calculate the orientation and extension of the skeleton associated with the arm, or other limb. Once the orientation and extension of the skeleton is determined, the processor 10 (or 320) may estimate the position and movement of other components of the limb not specifically visible to the IDT system 200, such as the hand, wrist, etc., based on the position and movement of visible or imaged limb. This allows IDT system 200 to estimate positions and movements even when the imaging projector is shielded from portions of the field of view. The estimated position and movement may be used to flag behavior.

As described above, the IDT system 200 has a field of view. As limbs, products, or other objects to be tracked enter the field of view, the IDT system 200 determines the location of the object within the field of view and may identify the relative distances between, for example, the limb and the post-purchase product location (or other topographical references). The IDT system 200 may estimate the predicted motion of the limb and/or product as it move between the pre and post purchase product locations and flag suspicious activity when the tracked limb deviates by a certain percentage from the expected or estimated path.

Figure 3:
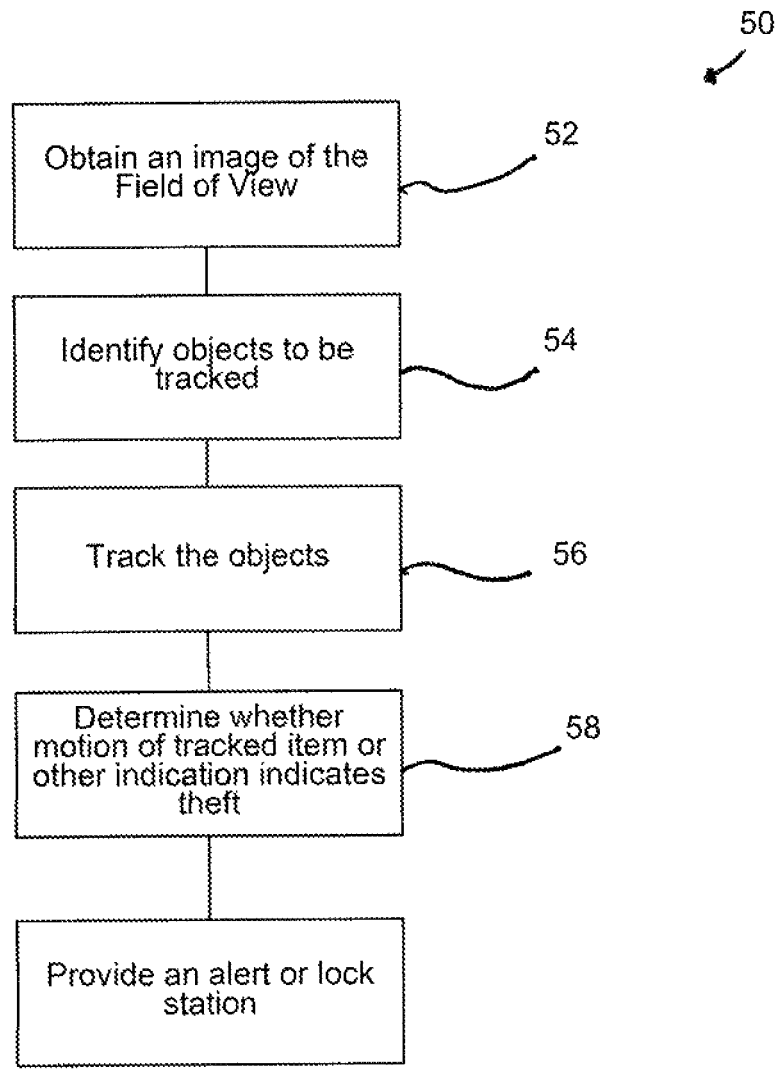
FIG. 3 is an exemplary methodology associated with using the technology of the present application.

With reference now to FIG. 3, an exemplary method 50 of using the technology of the present application is provided. A step 52 includes obtaining an image of the field. A step 54 includes identifying the objects to be tracked in the field of view, which images may include the product being purchased, the limbs or the customer, a combination thereof, or the like. A step 56 includes tracking the objects in the field of view while the objects are in the field of view. A step 58 includes determining whether the tracked motion of the objects is indicative of suspicious behavior including theft. Such a determination may include, the customer's limb deviating from an estimated path of travel through the field of view, an orientation of the limb or limbs (particularly the hand or body), a placement of objects to obscure the field of view, a change of the product being purchased (which change may be size, color, labeling, or the like), a change of the position of items in a shelf if the IDT system 200 is used to general monitoring of retail space. For example, the IDT system 200 may image a shelf of retail items that contain 10 white bottle of size and shape X and 4 green bottles of size and shape Y. IDT system 200 may indicate suspicious behavior if the limb of the customer moves over the shelf space and the shelf subsequently contains 9 white bottles and the customer's limb movement indicates the limb moved inside of a coat, not to a container, and the customer's hand is not carrying a white bottle. Other motion that may be indicative of suspicious behavior includes hand motion indicative of, for example, palming an object, multiple limbs moving in the field of view indicating a change of one item for another, a change in the overall bulkiness of a customer's clothing, a bulge in a pocket, or the like.

In one embodiment, processor 320 or processor 10 may be operatively connected to a database, which may be stored in memory 12 for example. The database may have movements that are correlated to unwanted behaviors, such as, theft. For example, if a hand is tracked from a customer to the pre-purchase product location, across the scanner, and to the post-purchase product location, the processor may search the database for the related movement sequence. If the sequence is in the database as "allowed" movement or not in the database, the system may continue to function normally. In another example, however, the hand is tracked from a customer to the pre-purchase product location, away from (as opposed to across) the scanner, and to the post-purchase product location, the processor may search the database for the related movement sequence. This sequence may be indicated as "not allowed" or "suspicious," which may cause the self-checkout station to lock until an employee addresses the issue or may cause the processor to send an alert to a security office or individual. Of course, these are but two examples of potential motions and the like. Other motions may include, not exhaustive, movements that tend to shield a customer's hand or hands from causal observation, movements to scan one item and place another in the post-purchase product location, movements tending to distract observation, movements to obscure lines of sight, and the like. Similar sequences may be possible for handling items in different locations in a store, such as, for example, a retail shelf, a dressing room, outdoor areas, etc. In at least one embodiment, the technology of the present application provides a database of allowed or expected movement of limbs or products indicative of a conventional purchase of an item. In at least another embodiment, the technology of the present application provides a database of un-allowed or suspicious movement of limbs or products indicative of nefarious actions. In still another embodiment, the technology of the present application provides a database combining both allowed and un-allowed movements. In these representative example, if the database contains allowed movement, the system determines whether the detected movement corresponds to an allowed movement in the database. If the determination is the movement is allowed, the system continues to allow placement in the post-purchase location, and the next item to be scanned or the purchase completed. If the system determines the movement detected does not correspond to an allowed movement, the system sends a violation signal. The violation signal may cause the system to lock until an employee checks and clears the violation. Alternatively, the system may continue to function normally, but the violation signal may alert an employee to check the customer and system prior to store exit. In yet another example, the system may continue to function normally until purchase confirmation, where the system will require specific employee interaction with the device. If the database contains un-allowed movements, if the system determines the movement is un-allowed, the violation signal will be sent, consistent with the above. If the system determines that the movement is not un-allowed, the system will function normally. For databased combining allowed and un-allowed movements, if the detected movement is allowed, the system functions normally. If the detected movement is un-allowed, the system sends the violation signal consistent with the above. If the detected movement is neither allowed nor un-allowed, the system may send either the violation signal, consistent with the above, or some alternative alert or warning signal. The alert or warning signal may prompt an employee interaction with the customer. The violation signal associated with movement may be referred to as a movement violation signal.

Notice that the technology of the present application also tracks the running total weight in the post-purchase location 106. Thus, if the actual weight differs from the expected weight, the technology of the present application would similarly generate the violation signal consistent with the above description of a violation signal. In one exemplary embodiment, if the actual weight differs from the expected weight by 10%, the violation signal may be generated. In another exemplary embodiment, if the actual weight differs from the expected weight by any of 8%, 7%, 6%, 5%, 4%, 3%, 2%, 1%, or factions thereof, the violation signal may be generated. Advantageously, the technology of the present application may provide a variable weight check. If no un-allowed movements are detected (or if only allowed movements are detected), the technology of the present application may provide a first weight difference (expressed above as a percentage, but could be an absolute weigh number as well) at which a violation signal is generated. If a first predetermined number of un-allowed (or not allowed) movements are detected, the technology of the present application may provide a second weight difference less than the first weight difference at which a violation signal is generated. If a second predetermined number of un-allowed (or not allowed) movements are detected, where the second predetermined number is greater than the first predetermined number, a third weight difference less than the second weight difference may be provided at which a violation signal is generated. This can be provided for any number of predefined un-allowed (or not allowed) movements.

Figure 4:
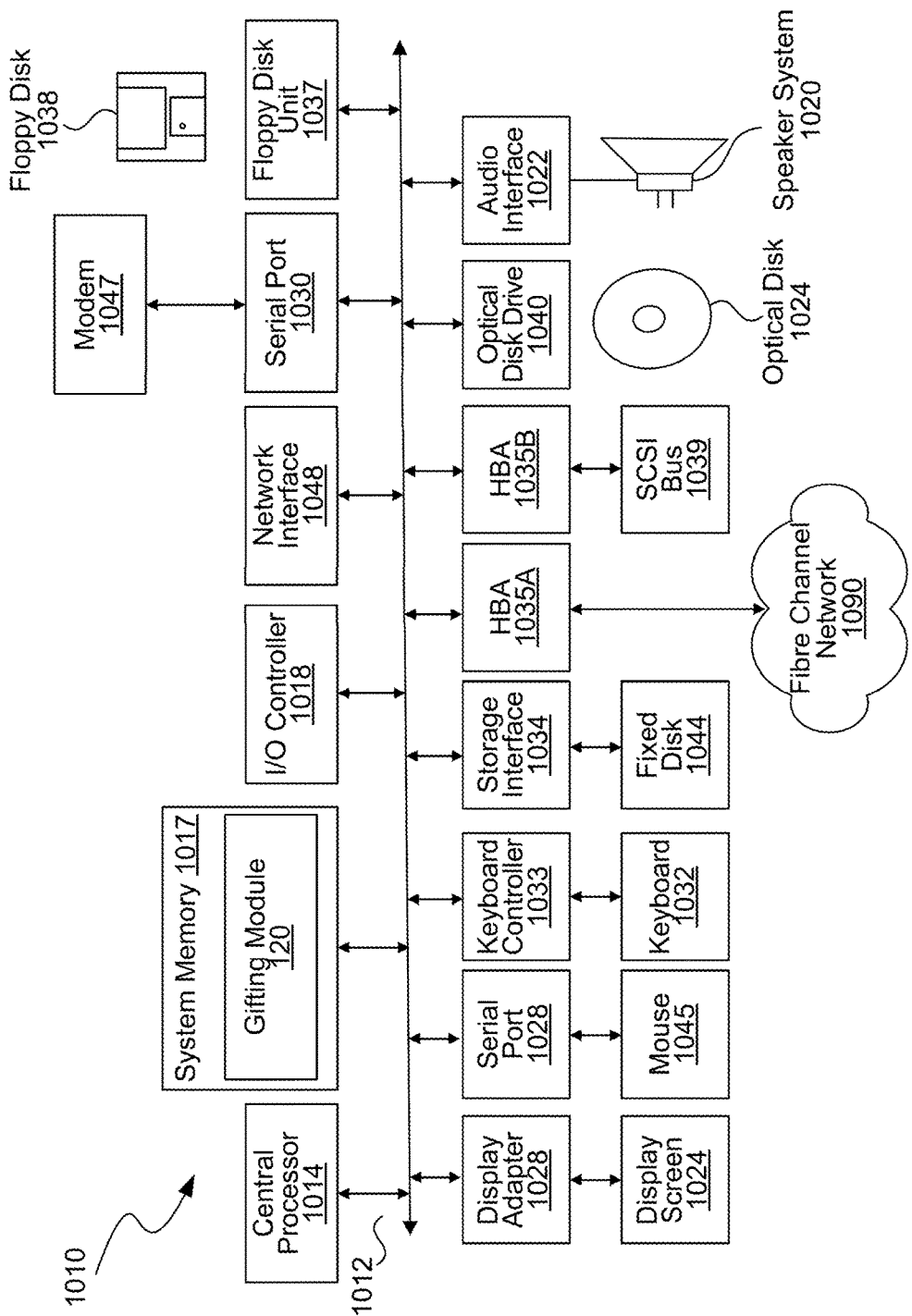
FIG. 4 is a functional block diagram of a system capable of embodying portions of the technology of the present application.

FIG. 4 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1090), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1045 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other codes, the Basic Input-Output system (BIOS) which controls basic hardware operation such as the interaction with peripheral components or devices. For example, the gifting module 120 to implement the present systems and methods may be stored within the system memory 1017.

Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an Internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 4 need not be present to practice the present systems and methods. The devices and subsystems can be interconnected in different ways from that shown in FIG. 4. The operation of a computer system, such as that shown in FIG. 4, is readily known in the art and is not discussed in detail in this application. Code to implement the present disclosure can be stored in computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Figure 5:
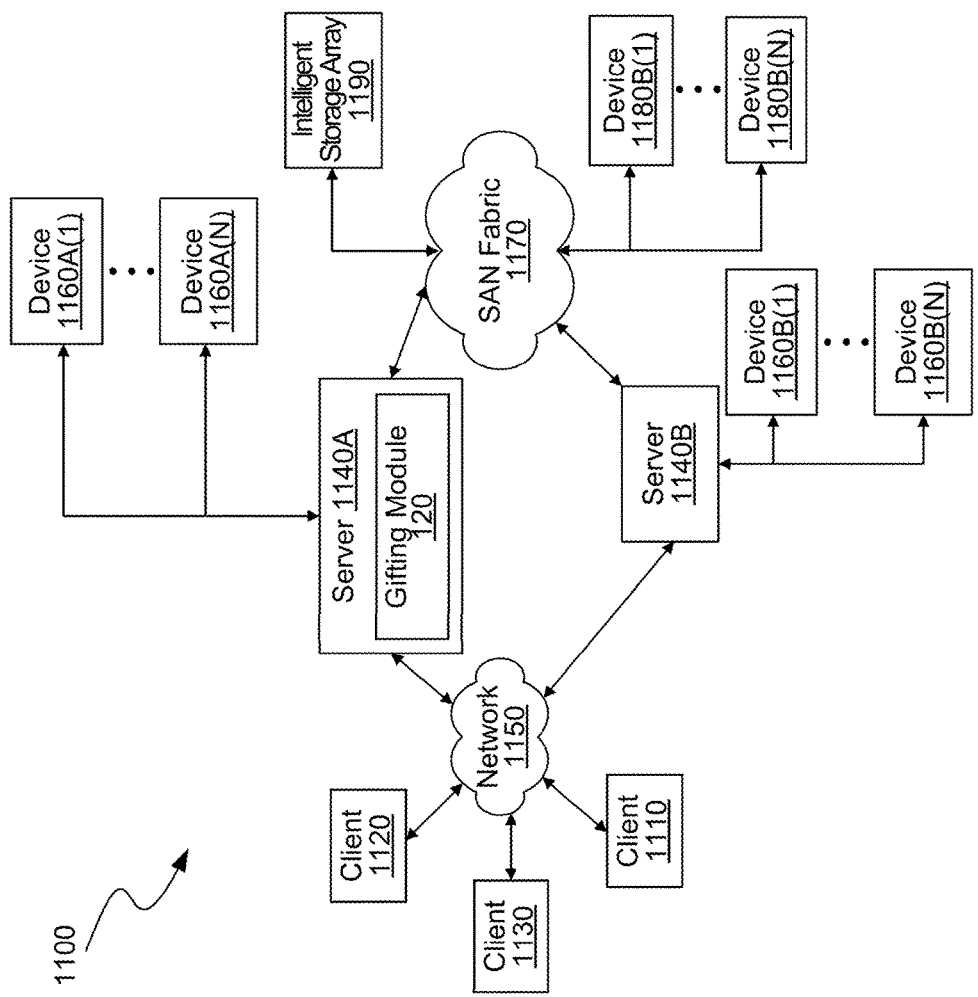
FIG. 5 is another functional block diagram of a system capable of embodying portions of the technology of the present application.

FIG. 5 is a block diagram depicting a network architecture 1100 in which client systems 1110, 1120 and 1130, as well as storage servers 1140A and 1140B (any of which can be implemented using computer system 1110), are coupled to a network 1150. In one embodiment, the gifting module 104 may be located within a server 1140A, 1140B to implement the present systems and methods. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1 HN) or intelligent storage array 1190. FIG. 5 depicts the use of a network, such as the Internet, for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. A system for facilitating the detection of theft in self-checkout systems, the system comprising:

a processor;

a scanner operatively coupled to the processor and configured to detect and transmit to the processor a scanned product from a plurality of products being scanned for purchase;

a memory containing at least one database of predefined movements through a field of view and product information corresponding to the plurality of products wherein the product information comprises at least a cost and a weight of each of the plurality of products, the memory operatively coupled to the processor;

an image detector, the image detector to at least detect and track actual movement through a field of view, the image detector operatively coupled to the processor to transmit the tracked actual movement to the processor;

a portable post-purchase location contained in the field of view of the image detector and located a distance from a pre-purchase location, the post-purchase location comprising at least one scale to detect and transmit to the processor a total weight of products placed in the portable post-purchase location wherein the scale is operatively coupled to the processor;

the processor configured to fetch from the memory the weight of the scanned product detected and sum the weight of each of the scanned products detected during a transaction, the processor configured to obtain the total weight of products placed in the portable post-purchase location from the scale, the processor to compare the sum and the total weight to determine whether the sum and the total weight are within a predefined tolerance, wherein the processor does not generate a weight violation signal when the sum and the total weight are within a predefined tolerance and does generate the weight violation signal when the sum and the total weight are outside the predefined tolerance; and the processor configured to compare the tracked actual movement through the field of view to the predefined movements through the field of view, wherein the processor generates a movement violation signal based on the comparison of the tracked actual movement and the predefined movements through the field of view.

2. The system according to claim 1 wherein the processor comprises a plurality of processors operatively coupled.

3. The system according to claim 1 wherein the processor counts a number of movement violation signals.

4. The system according to claim 3 wherein the processor changes the predefined tolerance to a second predefined tolerance when the number exceeds a predefined threshold.

5. The system according to claim 1 wherein at least one database of predefined movements through a field of view comprises at least one allowed movement and wherein the movement violation signal is generated only when the comparison of the tracked actual movement and the at least one allowed movement indicates the tracked actual movement is not any of the at least one allowed movement.

6. The system according to claim 5 wherein the processor generates an estimated tracked movement when the field of view is obscured.

7. The system according to claim 6 wherein the tracked movement comprises tracking the movement of an anatomy of a customer.

8. The system according to claim 6 wherein the tracked movement comprises tracking the movement of the scanned product.

9. The system according to claim 1 wherein at least one database of predefined movements through a field of view comprises at least one un-allowed movement and wherein the movement violation signal is generated only when the comparison of the tracked actual movement and the at least one un-allowed movement indicates the tracked actual movement is any of the at least one un-allowed movement.

10. The system according to claim 9 wherein the processor generates an estimated tracked movement when the field of view is obscured.

11. The system according to claim 10 wherein the tracked movement comprises tracking the movement of an anatomy of a customer.

12. The system according to claim 10 wherein the tracked movement comprises tracking the movement of the scanned product.

13. The system according to claim 1 wherein the weight violation signal locks the system.

14. The system according to claim 1 wherein the movement violation signal locks the system.

15. The system according to claim 1 wherein the portable post-purchase location is a push shopping cart.

16. The system according to claim 1 wherein the portable post-purchase location is a hand carry basket.

17. The system according to claim 1 wherein the product information corresponding to the plurality of products comprises a stored product image of each of the plurality of products and wherein the image detector captures a scanned product image wherein the processor compares the stored product image to the scanned product image to determine whether the scanned product image matches the stored product image and wherein the processor generates a product violation signal only when the stored product image and the scanned product image do not match.

18. A method for facilitating the detection of theft in self-checkout systems, the method comprising:
- obtaining an image of a field of view wherein the field of view contains a post-purchase product location into which at least one purchased product is placed;
- receiving at a processor data from a scanner corresponding to a product to be purchased, wherein the data identifies the scanned product from a plurality of products;
- tracking movement through the field of view as the scanned product is moved to the post-purchase product location using an image detector;
- determining whether the tracked movement is an allowed movement by comparing the tracked movement to allowed movement stored in memory;
- generating a movement violation signal when the tracked movement is determined to be an un-allowed movement;
- receiving a signal at the processor from the post-purchase product location of a total actual weight of purchased products contained in the post-purchase product location;
- calculating by the processor the total expected weight by summing the weights of the scanned products using weight data stored in the memory;
- generating a weight violation signal when the total expected weight and the total actual weight are outside of a predefined tolerance.

* * * * *